US006532281B1

(12) United States Patent
Schoenborn (10) Patent No.: US 6,532,281 B1
(45) Date of Patent: Mar. 11, 2003

(54) METHOD AND SWITCHING DEVICE FOR BILLING TELECOMMUNICATIONS NETWORK

(75) Inventor: Franz Schoenborn, Bonn (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/331,740
(22) PCT Filed: Dec. 10, 1997
(86) PCT No.: PCT/DE97/02870
§ 371 (c)(1),
(2), (4) Date: Jun. 25, 1999
(87) PCT Pub. No.: WO98/30012
PCT Pub. Date: Jul. 9, 1998

(30) Foreign Application Priority Data

Dec. 27, 1996 (DE) .......................... 196 54 482

(51) Int. Cl.[7] .............................. H04M 15/00
(52) U.S. Cl. ............... 379/114.01; 379/114.03; 379/114.06
(58) Field of Search ............... 379/111, 112.01, 379/114.01, 114.03, 114.06, 114.1, 115.01–115.02, 120, 121.02, 121.04, 126, 127.01, 133–134; 705/52–53, 30, 34, 40

(56) References Cited

FOREIGN PATENT DOCUMENTS

WO   WO 02/10961 A2 * 2/2002

OTHER PUBLICATIONS

Shin et al, How to make telecom pricing stratergy using data warehouse approach, 1988 IEEE, vol. 1060–3425, p. 55–60.*

* cited by examiner

*Primary Examiner*—Duc Nguyen
(74) *Attorney, Agent, or Firm*—Kenyon & Kenyon (57) ABSTRACT

An administratively optimized process and/or system for metering communication tariffs which—with the aid of a flat-rate-calculating computer, which is connected to an associated exchange for customer terminals—carries out automatic administratively optimized metering of communication tariffs. Such automatic, administratively optimized metering of communication tariffs is suitable both for digitized, as well as for analog communication networks, implemented as wire-bound, radio-based or laser-assisted, terrestrial or satellite networks. Each terminal is connected to a communication meter which is sealed or otherwise protected against manipulation and can be read off using telemetry or, when prompted, by the customer using a special meter-reading card. The flat-rate-calculating computer processes the information pertaining to consumed volumes of information in three ways. First, it compares the current values with the specified process breadths and, if process alarm limits have been exceeded, generates a process alarm; it checks the current consumption values for a possible trend development and generates an indicator alarm in response to a limit-value exceeding trend. It stores the charge information, process behavior and alarms in a system memory for documentation purposes. At a predetermined time or if there is a special need, it calculates a new flat-rate value which corresponds to the changed communication behavior of the particular customer or group of customers. For the purpose of control, the flat-rate-calculating computer is connected to an operator terminal having a record printer.

19 Claims, 4 Drawing Sheets

METHOD AND SWITCHING DEVICE FOR BILLING TELECOMMUNICATIONS NETWORK

FIELD OF THE INVENTION

The present invention relates to a process and device for metering communication tariffs in communication networks.

RELATED TECHNOLOGY

In analog communication, communication tariffing processes have been used. These processes offer the possibility of using prices to control the traffic in the network. Thus, for example, so-called "moonlight tariffs" were used in the eighties; these employ a rigid tariff structure subdivided into just a few tariff groups. Although, in principle, these processes provide the possibility of using prices to control the traffic, they only permit a very rudimentary form of traffic control, because the division into defined, time-dependent price groups does not take account of the actual line load. Recently, methods have become known which make it possible to measure the telephone habits of individuals or of groups of people in a relatively simple manner. For example, profiles of customers' phoning habits can be produced. So-called call behavior analysis methods make it possible for such profiles to be determined using measuring techniques and to generate them by evaluating measuring results. In "telekom/praxis", no. 9/96, vol. 73, a so-called call behavior analysis (CBA) system created by the firm Hewlett-Packard is described by John Taylor in an article entitled "Call Behavior Analysis" on pages 39 and 40.

British Patent Application No. GB-A-2 265 522 describes a system for registering hand-held cordless telephones used in mobile communications systems via an air interface. The system has an exchange, which is part of a PSTN-Public Switched Telephone Network, and, additionally, terminals of a communication network, and is linked via connections and lines to a computer unit for charge units. This system is intended to enable wireless telephones to handle prepaid communication connections. For this purpose, relevant data, together with the registration data, are transmitted to the hand-held unit. To calculate prices, the system measures the consumed charge units and subtracts them from the stored credit amount. Thus, this system is also based on conventional charge units and does not take into consideration the possibilities offered by digital technology for measuring transmitted volumes of information in a volume-specific manner. Moreover, no methods are given for calculating usage charges as flat rates.

In the system, each terminal is equipped via lines with a communication meter, which is read off either automatically using telemetry or, when prompted, by the customer.

SUMMARY OF THE INVENTION

An object of the present invention, therefore, is to provide a process and a system and/or circuit arrangement for administratively optimized tariffing in analog and digitized communication networks, which will take into consideration information about communication behavior and render possible specific user-related average call times per unit time/transmitted data volumes per unit time, and calculate a flat-rate amount for the individual customer or for groups of customers, which then becomes the basis for billing over an extended period of time.

In a process according to the present invention, the actual data communication charges are continually recorded. In addition, all call data is generally documented and stored or archived for a defined period of time. The basis for the process for administratively optimized communication tariffing is the average specific volume of charges per unit of time for each individual telecommunication customer. This average charge is fixed as a specific flat-rate amount, and an adjustment is made, annually for example, with the aid of software, with respect to the actually incurred charges, and accounts are automatically reconciled. Each year, for example, the flat-rate amount is automatically checked for correctness and, when required, adapted by the system to the current conditions. The process and system described here make it possible to economize substantially in terms of materials and administrative effort and, at the same time, to improve customer service by providing an easily understood rendering of accounts. Specific user-related average call times per unit time can be derived from available long-term or easily obtainable information about the communication habits of both individual customers, as well as of groups of customers. As an alternative to determining the call duration, it is generally quite possible in digital networks to measure the data volume transferred per unit of time (such as in megabytes per day, or the like). Consequently, a volume-specific quantity is available to measure the customer's network usage. The individual volumetric values are directly available at the output of the particular A/D converter in the case of individual devices. By measuring the telephone habits of individuals or of groups of people, one is able to create profiles of customers' phoning habits; and so-called telephone behavior analysis methods make it possible for such profiles to be determined using measuring techniques and to generate them by evaluating measuring results, as described, for example, by John Taylor in issue 9/96, vol. 73 of "telekom/praxis", on pages 39 and 40. These individual communication profiles are used to automatically determine, with the aid of a computer, average, individual cost profiles which are converted, in turn, into invoice amounts, calculated at the flat rate, at bimonthly, monthly or quarterly intervals with a periodic fine adjustment or precise reconciliation to actually incurred charges. The individual usage data is stored as internal-system data and is used as the basis for precisely reconciling and for fixing the long-term average charge values calculated as flat-rates. These average values, calculated as flat rates, are invoiced to communication-service users, for example, as bimonthly invoices over a one-year period. Since any differential amounts derived from the fine adjustment may be credits or debits, these can be set directly off of future usage charges or debits. In the case of new customers, the fine adjustment is carried out for a defined introductory period to verify the initially calculated flat-rates. If the resulting differential amount remains within a target sector of x percent of the exact value of the usage charge, the flat rates calculated are classified as correct and are fixed over a long term, for example for one year. With this flat-rate billing method, no invoices whatsoever need to be sent, resulting in huge savings for service providers such as Deutsche Telekom AG, which issues more than 40 million invoices for telecommunication services every month. The only exact invoice is produced by calculating the difference between measured values and estimated values in the form of an annual settling of accounts, such calculation being used for the fine adjustment at the end of a flat-rate billing period.

Further advantages, features and possible applications of the present invention will become apparent from the following description in conjunction with the embodiments shown in the drawings.

In the following, the present invention is described in greater detail with reference to embodiments shown in the drawings.

The terms and associated reference numerals in the appended list of reference numerals are used in the Specification, the Claims, the Abstract, and in the drawing.

DETAILED DESCRIPTION

The process described below makes it possible to achieve considerable savings in material and administrative effort, while at the same time improving customer service by providing an easily understood rendering of accounts for the individual customer's actual consumption.

The operating principle of the automated, administratively optimized tariffing is described in the following:

1. On the basis of available long-term or easily obtainable information about the communication habits both of individual customers and also of groups of customers, it is possible to derive specific user-related average call times per unit of time (call duration, day, week, month, year).

2. In digitized networks, as an alternative to determining the call duration, it is possible to measure data volumes transferred per unit of time, for example in megabytes per day or the like. Consequently, a precise, volume-specific quantity is available to measure the customer's network usage. The individual volumetric values are directly available at the output of the particular A/D converter in the case of terminal equipment/ individual devices.

3. The telephone habits of individuals or of groups of people are measured to create profiles of customers' phoning habits. This is accomplished, as already indicated, by employing measuring techniques to apply so-called telephone behavior analysis methods, including both determination and evaluation methods.

4. The individualized method extends both to groups of users, who, in turn, can be subdivided into subgroups, and to private individuals as well, who, for example, can be divided up into infrequent users, normal users and frequent users.

5. From these individual communication profiles, one can determine average, individual cost profiles, which are able to be converted into invoice amounts, calculated at the flat rate, at quarterly, bimonthly, or monthly intervals, with a periodic fine adjustment to exact charges incurred.

6. The individual usage data is stored and processes as internal-system data. It is used as the basis for precisely reconciling and fixing the long-term average charge values calculated as flat-rates in a computer 1 for calculating flat rates. These average values, calculated as flat rates, are invoiced to communication-service users, for example, as bimonthly invoices over a one-year period.

7. The fine adjustment is carried out, for example, at the end of each of the customer's contract years. Thus, after each year of membership, it is possible to adapt the flat-rate amounts to the subscribers' current, specific, average cost profiles.

8. Differential amounts from the fine adjustment are either credits or debits. The credits can, with the consent of the recipient of the invoice, be set directly off of future usage charges; debits are settled immediately.

9. New customers are assigned to an appropriate user class and thus put on an initial flat rate on the basis of customer data to be obtained from the customers.

Figure 1:
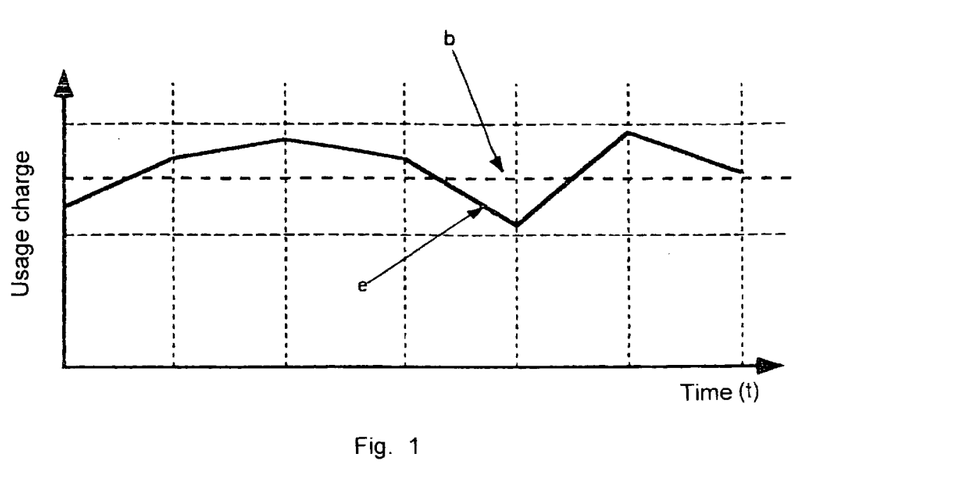
FIG. 1 shows a graph representing the relationship between usage charges, flat usage rates and exact consumption values.

10. In the case of new customers, the fine adjustment is carried out for a defined introductory period to verify the initially calculated flat rates. If the resulting differential amount remains within a target sector of x percent of the exact value of the usage charge, the flat rates calculated are classified as correct and are fixed over a long term, for example for one year. The graph in FIG. 1 illustrates the relationships between the flat usage rates and the exact consumption values.

11. When the flat-rate billing method is used, there is no longer a need to send any invoices whatsoever. The only exact invoice is produced by calculating the difference between measured values and estimated values, in other words between flat-rate amounts and exact usage charges, in the form of an annual settling of accounts.

Figure 2:
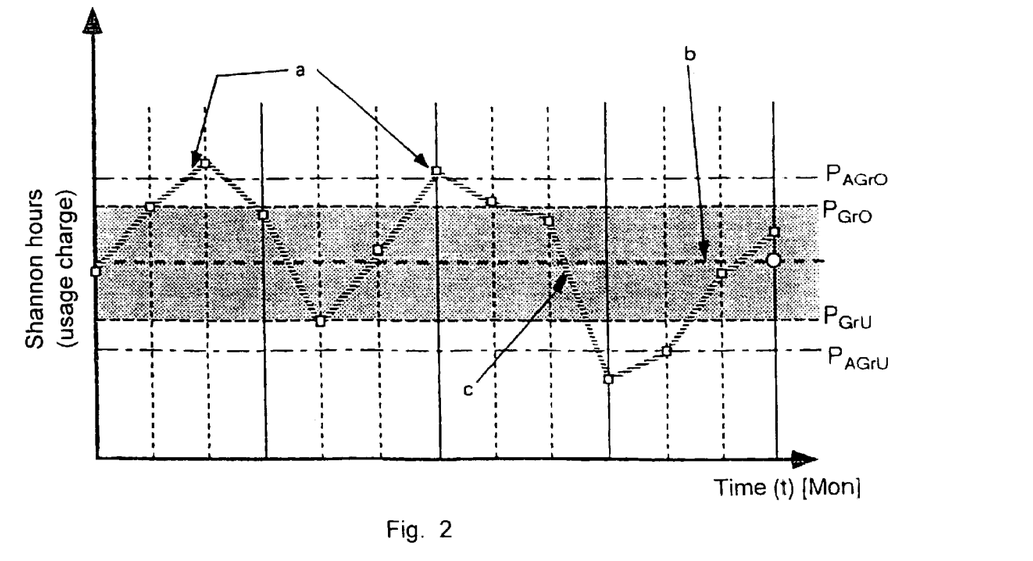
FIG. 2 shows a graph depicting the flat-rate price corridor being exceeded by the actual monthly usage charges.

FIG. 2 shows a graph demonstrating the fact that, in forming a trend, the deviations generally add up very quickly to amounts which exceed an alarm limit. As shown in FIG. 2 and as can be seen from the average-value curve, however, even after an alarm limit has been exceeded, there may be a return to the flat-rate corridor. In such a case, it would be premature for the system to intervene to fix a new flat-rate price. This can largely be resolved, for example, by necessitating that the upper process-alarm limit value $P_{AGrU}$ or lower process alarm limit value $P_{AGrU}$ be exceeded on at least two successive occasions before action is initiated by the flat-rate-calculating computer 1 according to FIG. 8 to fix a new flat-rate price. Thus, it is shown, for example, that, in the vacation months, the usage charges usually fall below the corridor, while, at certain times, they exceed the corridor. It can further be clearly seen from FIG. 2 that, at certain times, there may be a process alarm, shown at a. The arrow identified by b shows the usage flat rate, and the arrow identified by c shows the average monthly consumption.

Figure 3:
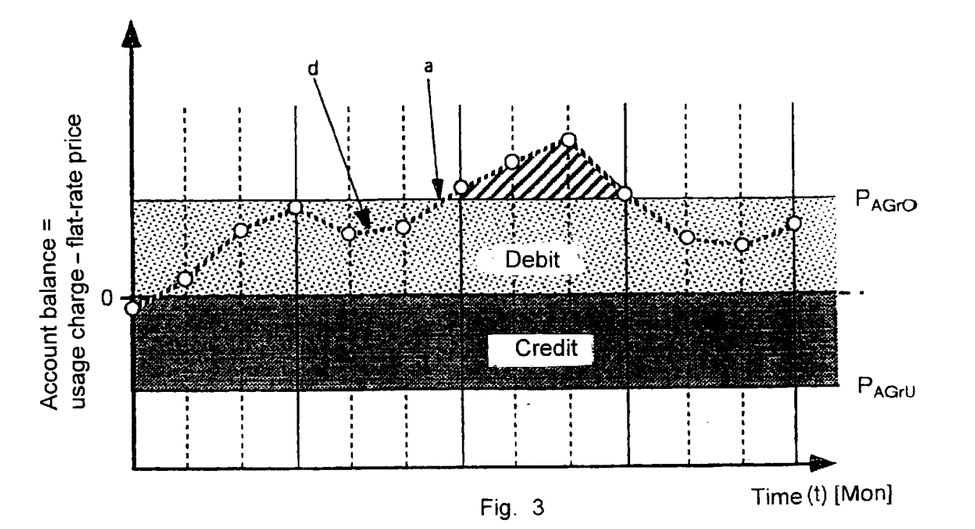
FIG. 3 shows a graph illustrating the exceeding of the flat-rate price corridor by the account balance being set off against the respective value of the previous month.

FIG. 3 shows a further graph showing the exceeding of the flat-rate price corridor by the account balance charged with the respective value of the previous month. Once again, the arrow identified by a shows the point for the process alarm, the arrow identified by d indicating the difference with respect to the flat-rate amount. The respective account balance is equal to the usage charge minus the flat-rate price. The flexibility can be further increased by evaluating various instances of the flat-rate alarm limit being exceeded discontinuously. This can be achieved, for example, in that the amount by which the limit is exceeded and the time when it is exceeded are brought into relationship with each other. In any case, it is advisable to offset the instances when upper process-alarm limit value $P_{AGrO}$ is exceeded against the instances when lower process-alarm limit value $P_{AGrU}$ is exceeded within an assessment period or, for long-term stabilization of the flat-rate price, also beyond that. This is important, for example, to be able to get past vacation times and the months of special communication activity, without the alarm being triggered.

Figure 4:
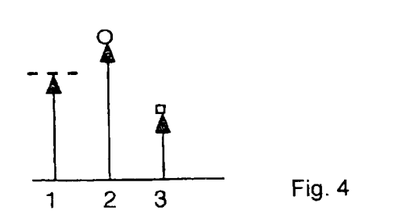
FIG. 4 shows a vector diagram representing the relationships between the monthly flat-rate payment, the actual usage charge and the actual monthly consumption.

FIG. 4 shows the relationship between the monthly flat-rate payment, the actual usage charge and the actual monthly consumption. Arrow 1 shows the monthly flat-rate payment; arrow 2 shows the monthly difference between the actual usage charge and the monthly flat-rate payment; and arrow 3 shows the actual monthly consumption in Shannon hours, corresponding to the actually incurred usage charges.

It must once again be emphasized that, in a process according to the present invention, all actual communication charges are continually recorded. In addition, however, all call data is also generally to be documented and stored for a defined period of time. The basis of the automated administratively optimized communication tariffing VKT described herein is the average specific volume of charges per unit time of each individual telecommunication customer. This average charge is fixed as the specific flat-rate amount. Each year, an adjustment is made with the actually incurred charges and the account is reconciled. The flat-rate amount is checked annually for correctness and, if needed, adapted to the current conditions. It is also possible, of course, to introduce other periods of time. In this case, a communication consumption unit is defined, according to which it is possible to measure and tariff the transmitted volume of data as a measure of "consumed information" in the form of communication units. Proposed as the measure of consumption is the unit of the megabyte hour measured in Shannon (SHh).

Figure 5:
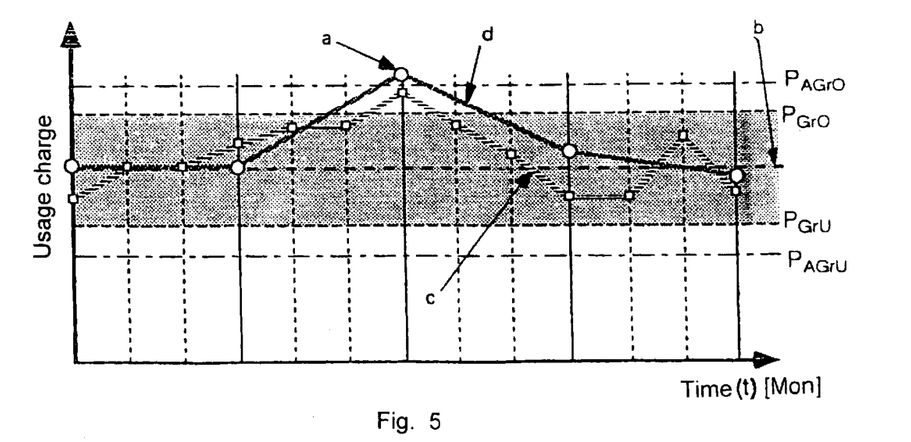
FIG. 5 shows a graph representing the breadth of a process according to the present invention.

The fluctuations in the monthly communication consumption, with the highest and lowest values omitted, form—over the period of time used—the process breadth within which the actual volume of charges is allowed to vary. To determine the process breadth, a monthly average-value curve is calculated from the measured daily values, as shown in the graph according to FIG. 5. From these monthly average values, the idealized average value is calculated as the flat-rate value for one year at a time. Once again, arrow a in the graph according to FIG. 5 points to the process alarm point; arrow b points to the flat usage rate (shown by a broken line); arrow c points to the curve of the average monthly consumption; and arrow d points to the curve of the average quarterly consumption. Each measurement point (°) indicates an average quarterly value, formed from the measurement points of the average monthly values (□). The average quarterly value is the assessment criterion used to determine the level of the specific flat-rate amounts. The extent of the variations in the monthly average-value curve forms the upper and lower process limit values $P_{GrO}$ and $P_{GrU}$, ie., the greatest deviations from the flat-rate value towards higher and lower information consumption. A percentage increase in these process limit values, to be derived from the specific communication profile, forms the process alarm limit values a. If these limit values are exceeded, a system alarm is triggered, indicating that, at that point in time, the flat-rate amount can no longer be reconciled to the annual consumption. The process limit values $P_{GrO}$ and $P_{GrU}$ indicate the range covered by the algorithm used for calculating flat rates. In this algorithm, parameters can be selected to provide flexibility. $P_{AGrO}$ and $P_{AGrU}$ are the process alarm limit values, which, when exceeded, prompt an alarm message during the process control. Given an otherwise normal process, deviations of this magnitude are not merely balanced out within the one-year period—i.e., up to the next flat-rate calculation. The flat-rate-calculating computer 1 continually compares whether any existing deviations vary within a defined range, either on the basis of weekly average values calculated for this purpose or using the monthly average values. If the deviations are too great, for example due to intensive use of online services, then the flat-rate-calculating computer 1 outputs an indication alarm signal. This indicates that, given the current trend, calculated from the subscriber specific data, of, for example, the last three months, the new flat-rate price differs from the previous one by more than 15 percent, for example. The indication alarm is used, for example, to arrange for a discussion to advise the customer in question.

Figure 6:
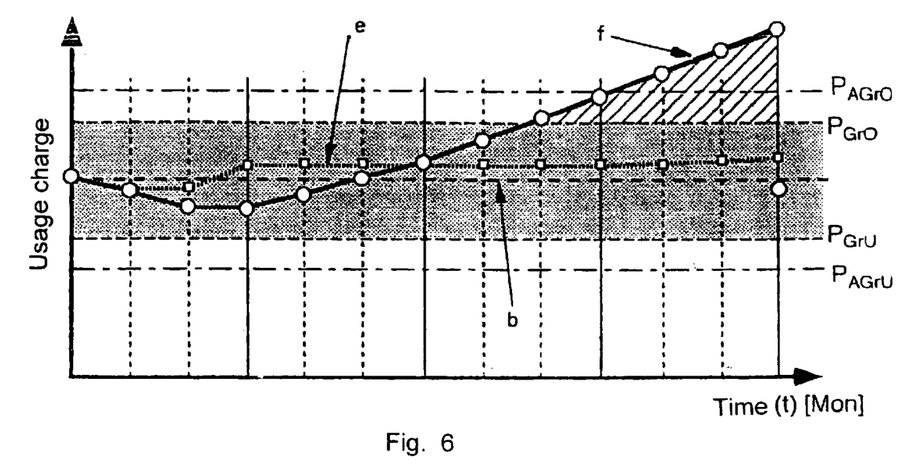
FIG. 6 shows a graph representing the trend deviations.

The graph shown in FIG. 6 shows the trend deviations as follows: in spite of only slight deviations (□) from the average process value (ideal value is flat-rate payment), the trend evaluation (°) shows that, with the selected flat rate, the process cannot be kept within the specified process breadth. The costs incurred can no longer be balanced out by the flat rate. In an inverse situation of low usage, it is likewise no longer possible to balance out the accumulating credit, i.e., a new flat rate must be calculated for the process. In FIG. 6, arrow b points to the flat usage-rate curve; arrow e points to the exact consumption-value curve; and arrow f points to the curve of the difference with respect to the flat-rate payment.

Figure 7:
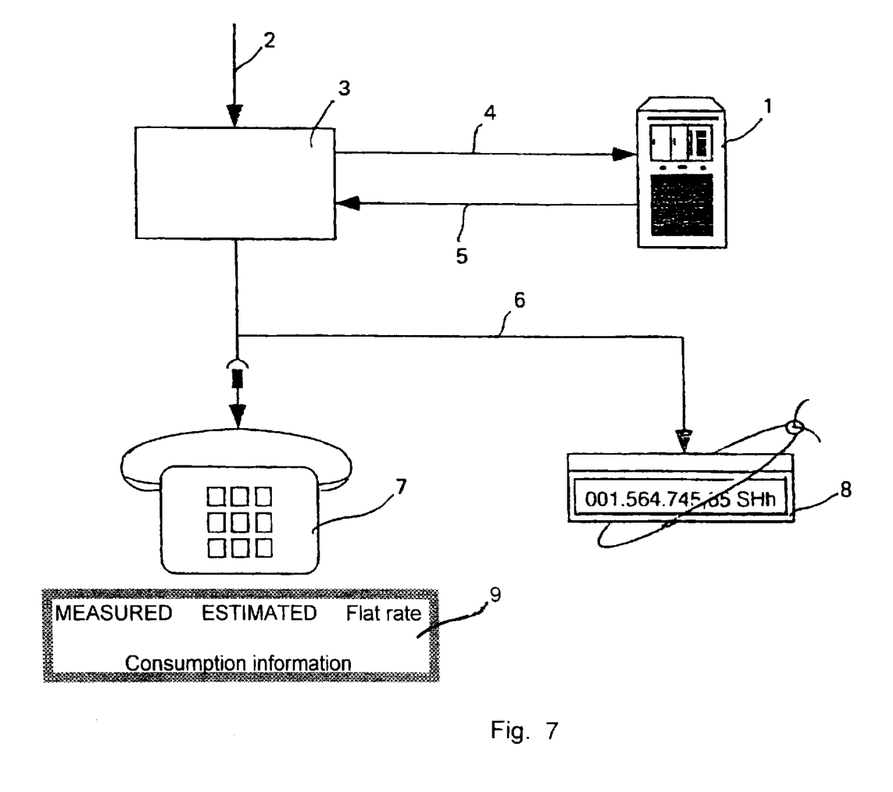
FIG. 7 shows a schematic diagram.

FIG. 7 shows an overview diagram of a system which operates in accordance with the process of the present invention. The system shown in FIG. 7 includes flat-rate-calculating computer 1, an exchange 3, a terminal 7 having a display 9, and a meter 8 for measuring communication consumption, for example a Shannon meter. Exchange 3 is linked via lines 6, both to terminal 7, as well as to meter 8. It receives the incoming information via line 2. Via the connections, lines 4 or the like, the charge information is sent to the connected flat-rate-calculating computer 1; and via the connections, lines 5 or the like, the flat-rate-calculation information is sent from the flat-rate-calculating computer 1 to exchange 3. In exchange 3, responsible for a specific customer, the continuously measured charge information is fed to the flat-rate-calculating computer 1, which, from this data, determines, at a defined specific date, the new flat-rate price for the next customer-specific account year. All data relevant to the settling of accounts, such as measured charges, estimated charges or flat-rate amount, are transmitted to terminal 7, where they can be logged automatically or manually, depending on the facility. Display 9 shows the consumed volume of information in the Shannon hours SHh units of measure. A Shannon hour is equal to the transferred volume of information, with allowance being made for the transmission capacity of the channel and the actual transmission speed on the channel. A communication meter 8 is connected to each terminal 7. This communication meter is generally a Shannon meter, which is installed at the customer site as a device which is sealed or otherwise protected against manipulation. The meter is read either automatically using telemetry or, when prompted, by the customer using a double, or specialized meter-reading card, who then returns the meter-reading card with its entered, read-off information to his or her communication provider. The flat-rate-calculating computer 1 processes the information pertaining to consumed volumes of information in three ways: it compares the current values to the specified process breadths and, in response to exceeding of the process alarm limit, generates the process alarm; it checks the current consumption values for a possible trend development, and, in response to a limit-value exceeding trend, triggers an indication alarm; it stores the charge information, process behavior and alarms for documentation purposes. Finally, at predetermined times, or if there is a special need, flat-rate-calculating computer 1 calculates a new flat-rate value which better corresponds to the modified communication behavior of a particular customer.

Figure 8:
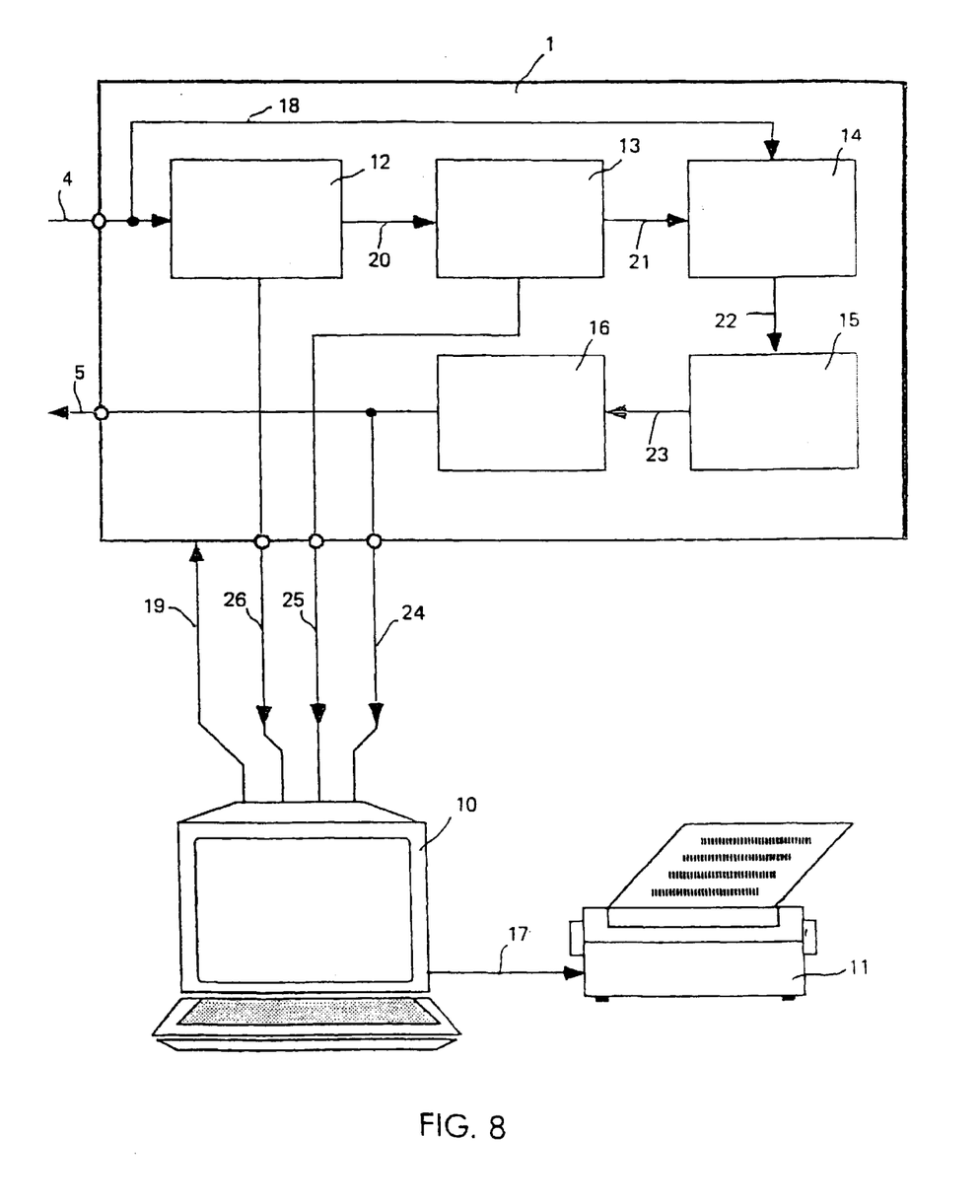
FIG. 8 shows a schematic diagram of a computer for calculating flat rates, including an operator terminal and printer according to the present invention.

FIG. 8 shows an overview diagram of a flat-rate-calculating computer 1, including its external connections. In this example, an operator terminal 10, which is linked via lines 19 and 24 through 26 to flat-rate calculating computer 1, is used to control flat-rate calculating computer 1. Moreover, operator terminal 10 is linked via a line 17 to a record, or status report printer 11. Line 19 is used for sending the information on parameter settings to flat-rate-calculating computer 1; line 26 is used for sending the process alarm signals from flat-rate-calculating computer 1 to operator terminal 10, line 25 is used for sending the indicator alarm signals from flat-rate-calculating computer 1 to the operator terminal 10; and line 24 is used for sending the flat-rate price indication information from the flat-rate calculating computer, likewise to operator terminal 10. The information on the flat-rate price is also sent from flat-rate-calculating computer 1 via the connection, line 5 or the like to the corresponding exchange, as shown in FIG. 7. Via a connection, line 4 or the like, flat-rate-calculating computer 1 receives from the aforementioned exchange the charge information, which, first, is supplied directly via a line 18 to system memory 14 and, second, is supplied to a circuit 12 for comparison of the process breadth. Via a line 20, circuit 12 sends its output signals to a circuit 13 to check for trend development; the output of the circuit being connected via a line 21 to system memory 14 and the circuit likewise transmitting, via line 25, an indicator alarm to operator terminal 10 at the appropriate time. On line 26, circuit 12 sends, when necessary, the process alarm signal to operator terminal 10. System memory 14 is linked via a line 22 to a comparison circuit 15 which performs the comparison between measured charges and flat rate minus estimated charges. The output of circuit 15 is linked via a line 23 to a circuit 16 for calculating the new flat-rate price, which is supplied to the outside via line 5 and via line 24 to operator terminal 10.

All the consumption data supplied to flat-rate-calculating computer 1, as well as all the data supplied from this computer to the customer's terminal (terminal 7 in FIG. 7) can be retrieved from operator terminal 10, and displayed. The data can be printed out as a log at connected printer 11. This system check can be performed both under operator control and also automatically, i.e., under system control. It should also be mentioned that the circuits 12 through 16 of flat-rate calculating computer 1 can also be implemented as system software in a single-processor or multiple-processor system.

Provided below are examples of calculating the flat-rate price for new customers, using parameter variations, such as those to be implemented in flat-rate-calculating computer 1, either in terms of software or hardware.

The flat-rate price for the new customer is estimated using various parameters. These parameters may, for example, be:

a) The customer making the estimation himself/herself b) The service provider performing the estimation on the basis of statistical data from anonymous customer profiles
   social class
   family circumstances
   occupation
   hobby/leisure activities c) The service provider performing the estimation on the basis of the services ordered
   POTS
   ISDN
      transmission channels
      type of connection
      number of call numbers
   data services
   online services
   leased lines
   mobile communication
   broadband connections d) The service provider performing the estimation on the basis of the connected communication devices
   analog phones
   digital phones
   fax machine
   private branch exchange
   data terminals
   computers
   telematic devices
   answering machines From these and possibly additional estimated parameters, the flat-rate price is derived for the new customer as:

$$P0 = G1*VSEK + G2*Vtstat + G3*VTDLstg + G4*VTKGer$$

where $Gn(n=1 \ldots 4)$=weighting factors for the estimated values

| | |
|---|---|
| VSEK = | consumption according to customer estimate |
| Vtstat = | consumption according to service Provider estimate (criterion b)) |
| VTDIstg = | consumption according to service Provider estimate (criterion c)) |
| VTKGer = | consumption according to service Provider estimate (criterion d)) |

Weighting factors

| | |
|---|---|
| G1 = 0.1 | (assessment of customer estimate) |
| G2 = 0.3 | (assessment of social class according to customer profiles) |
| G3 = 0.3 | (assessment of expected usage on the basis of services ordered) |
| G4 = 0.3 | (assessment of expected usage on the basis of connected communication equipment) |

Examples of further flat-rate price calculations:

Current flat-rate price for the year J0:

$$PJ0 = \frac{PJ-1 + PJ-2 + PJ0}{3} + PYV\ddot{A}nd$$

where PTVÄnd=flat-rate-based change component, if this is to be taken into consideration The flat-rate price should be re-calculated if the "debit" or "credit limit" $P_{AGrO}$ or $P_{AGrU}$ is exceeded in two successive assessment periods (months):

$$PJ0\text{new}: (P_{AGrO}(tn)+P_{AGrO}(tn-1))-2PJ0=<0(\text{debit})$$

or $$PJ0\text{new}: (P_{AGrU}(tn)+P_{AGrU}(tn-1))-2PJ0=>0(\text{credit})$$

where $P_{AGrO}$=upper alarm limit (debit limit amount)
and $P_{AGrU}$=lower alarm limit (credit limit amount)
tn current assessment period
tn−1 previous assessment period List of Reference Symbols 1 Flat-rate-calculating computer
2 Line
3 Exchange
4,5 Connection, line or the like
6 Line
7 Terminal
8 Meter
9 Display
10 Operator terminal
11 Record printer
12 Comparison circuit
13 Test circuit
14 System memory
15 Comparison circuit
16 Computing circuit
17 Through 26 line
VKT Administratively optimized tariffing

What is claimed is:

1. A process for optimized metering of communication tariffs in a communications network, the process comprising:

measuring at least one communication parameter for an individual customer or a group of customers on all calls of the communications network to determine an individual communication profile;

measuring an actual communication consumption on the communications network for the individual customer;

deriving at least one user-related average transmitted information volume per unit of time from the individual communication profile;

executing, using a computing device, an algorithm for calculating an idealized average transmitted information volume from one of the at least one user-related average transmitted information volume per unit of time and for calculating a flat-rate for a specific period of time from the idealized average transmitted information volume;

generating a percentage amount from the individual communication profile and adding the percentage amount as a positive and negative amount to the idealized average transmitted information volume so as to establish upper and lower process limit values defining a range, corresponding to the flat-rate, of fluctuation in individual communications habits about the idealized average transmitted information volume;

generating an additional percentage amount from the individual communication profile and adding the additional percentage amount to the upper and lower process limit values so as to establish corresponding upper and lower process-alarm limit values beyond which the flat-rate can not be reconciled with the measured actual communication consumption over a flat-rate-calculating time period;

generating, using the computing device, a process alarm in response to an exceeding, by at least one of the at least one user-related average transmitted information volume per unit time, of either the upper process-alarm limit value in the positive direction or the lower process-alarm limit value in the negative direction; and calculating, using the computing device, in response to the generating of the process alarm, a first adapted idealized average transmitted information volume and a first adapted flat-rate.

2. The process as recited in claim 1 further comprising:

monitoring continuously, using the computing device, the at least one user-related average transmitted information volume per unit of time so as to identify any trend exceeding either the upper process limit value in the positive direction or the lower process limit value in the negative direction;

generating, using the computing device, a second indicator alarm as an early-warning signal in response to the trend exceeding either the upper process limit value in the positive direction or the lower process limit value in the negative direction; and calculating, using the computing device, in response to the trend exceeding either the upper process limit value in the positive direction or the lower process limit value in the negative direction, a second adapted idealized average transmitted information volume and a second adapted flat-rate.

3. The process as recited in claim 1 wherein the communications network is at least one of digitized and analog, and implemented as at least one of a wire-bound, radio-based, laser-assisted, terrestrial and satellite network, and wherein the communications network comprises calling and called subscriber terminals, the calling and called subscriber terminals being interconnected via exchanges of the communication networks or having transmission channel implemented as a virtual packet-based or cell-based channel.

4. The process as recited in claim 1 wherein the unit of time includes at least one of a day, a week, a month and a year.

5. The process as recited in claim 1 further comprising:

delivering the measured actual communication consumption to the computing device in a form of data capable of being electronically processed via connections or lines;

calculating, based on the data, a new flat-rate price for a next year of a customer account using the computing device at a predefined date;

displaying, at a terminal of the customer, all data relevant to a settling of the account;

providing a communication meter assigned to the terminal for counting the measured actual communication consumption;

comparing the measured actual communication consumption with the upper process limit value the lower process limit value using the computing device;

comparing the measured actual communication consumption with the upper process-alarm limit value and the lower process-alarm limit value using the computing device;

storing the measured actual communication consumption in a system memory of the computing device;

storing the idealized average transmitted information volume, the flat-rate, and the upper and lower process limit values in the system memory;

storing the generated process alarm and generated indicator alarm in the system memory;

storing the adapted idealized average transmitted information volume and the adapted flat-rate in the system memory; and calculating, using the computing device at a predefined individual customer-specific point in time or following a special necessity, an modified flat-rate adapted to a current individual communication profile.

6. The process as recited in claim 1 wherein the upper and lower process limit values and the upper and lower process-alarm limit values are flexibly definable.

7. The process as recited in claim 1 further comprising storing the measured actual communication consumption in a system memory of the computing device;

determining flat-rate charges from the calculated flat-rate and automatically invoicing the flat-rate charges and other usage data at flexibly definable intervals to the individual customer;

calculating, using the computing device at a predefined individual customer-specific point in time or following a special necessity, an modified flat-rate adapted to a current individual communication profile;

periodically reconciling the stored measured actual communication consumption with the idealized average transmitted information volume so as to determine a difference amount; and automatically charging the difference amount directly to an account of the individual customer.

8. The process as recited in claim 1 wherein the individual customer is a new customer having corresponding customer data and further comprising:

assigning the new customer to a defined user class;

calculating an initial flat-rate for the new customer;

calculating a flat-rate charge amount base on the initial flat-rate;

reconciling, for a defined settling period, the measured actual communication consumption with the idealized average transmitted information volume so as to determine a charge difference amount for verifying the initial flat-rate; and calculating, when the charge difference amount is within a specified target sector of +/−X% from the value of the flat-rate charge amount, a long-term flat-rate value using the algorithm and the charge difference amount.

9. The process as recited in claim 8 wherein the reconciling is performed every three months.

10. A circuit arrangement for optimized metering of communication tariffs in a communications network, the circuit arrangement comprising:

an exchange;

a computing device linked to the exchange via at least one of a connection, line, and transmitting device, the computing device:

having an algorithm for calculating a flat-rate;

generating a process alarm in response to an exceeding, by a derived user-related average transmitted information volume per unit of time, of either an upper process-alarm limit value in the positive direction or a lower process-alarm limit value in the negative direction, the upper process-alarm limit value being calculated by adding a percentage amount to an upper process limit value, and the lower process-alarm limit value being calculated by subtracting the percentage amount from an upper process limit value, the percentage amount being derived from an individual communication profile, the process alarm indicating that the flat-rate can not be reconciled with a measured actual communication consumption over a flat-rate-calculating time period;

determining a difference, during a fine adjustment after a flat-rate-calculation period of time, between an actual consumption charge and the flat-rate-calculated charge; and continually comparing the measured actual communication consumption with the upper process limit value and the lower process limit value;

a terminal of the communication network linked to the exchange, the terminal including a display for indicating at least the measured actual communication consumption and a flat-rate communication consumption; and a communication meter being readable automatically using a telemetry device or on command.

11. The circuit arrangement as recited in claim 10 wherein the computing device:

continually monitors the measured actual communication consumption so as to identify any trend exceeding either the upper process limit value in the positive direction or the lower process limit value in the negative direction;

generates an indicator alarm so as to provide an early-warning in response to the trend exceeding either the upper process limit value in the positive direction or the lower process limit value in the negative direction;

automatically calculates, in response to the trend exceeding either the upper process limit value in the positive direction or the lower process limit value in the negative direction, an adapted flat-rate.

12. The circuit arrangement as recited in claim 10 wherein the communications meter is integrated with the terminal or is linked remotely to the terminal via lines or other transmission devices.

13. The circuit arrangement as recited in claim 10 wherein the communication meter includes a Shannon meter protected against manipulation for counting consumed information.

14. The circuit arrangement as recited in claim 13 wherein the Shannon meter counts consumed information in Shannon hours (SHh) based on transmitted information.

15. The circuit arrangement as recited in claim 10 wherein the communication meter is readable on command using a meter-reading card.

16. The circuit arrangement as recited in claim 10 wherein the computing device calculates usage charges and includes:

a system memory and a first comparison circuit connected to the system memory via at least one first line, the computing device receiving charge information via at least one of connections, second lines and other transmission devices, the charge information being supplied via the at least one first line to the system memory and the first comparison circuit for comparison to the upper and lower process limit values;

a test circuit for checking for any trend development, the test circuit being linked to an output of the first comparison circuit via a third line and an output of the test circuit being linked via a fourth line to the system memory;

a second comparison circuit for comparison of the measured actual communication consumption to a flat-rate communication consumption value minus an estimated communication consumption value, the second comparison circuit being linked to the system memory via a fifth line; and a computing circuit for calculating an adapted flat-rate price, the computing circuit being linked to an output of the second comparison circuit via a sixth line, an output of the computing circuit being connected via at least one seventh line to the exchange; and further comprising an operator terminal, the operator terminal being connected:

via at least one eighth line to the output of the computing circuit;

via at least one ninth line to the first comparison circuit for receiving the process alarm;

via at least one tenth line to the test circuit for receiving the indicator alarm; and via an eleventh line to the computing device for setting parameters.

17. The circuit arrangement as recited in claim 16 wherein the computing device calculates usage charges as flat-rate values and exact values.

18. The circuit arrangement as recited in claim 16 further comprising a record printer linked to the operator terminal.

19. The circuit arrangement as recited in claim 10 wherein, under an operator control, a control of the circuit arrangement is carried out semi-automatically and, under a system control, the control of the circuit arrangement is carried out with a system support or fully automatically.

* * * * *